Patented July 12, 1938

2,123,240

UNITED STATES PATENT OFFICE 2,123,240

RECOVERY OF VALUABLE METALS OR METAL COMPOUNDS FROM COMPLEX ORES

Axel Hammarberg, Lidingo, Sweden

No Drawing. Application June 8, 1936, Serial No. 84,177. In Sweden June 8, 1935

9 Claims. (Cl. 75—21)

The present invention relates to the recovery of valuable metals or metal compounds out of so-called complex ores, i. e. ores containing compounds of different kind of one and the same metal, e. g. an oxide and a sulphide, or compounds of different metals, e. g. oxides of two metals.

As a rule, the production of metal or metal compounds from such ores involves certain difficulties depending on the rigid bond of the constituents to each other rendering their separation from each other difficult or impossible. This holds true especially in case of complex oxide ores from which metal or metals are to be reduced, it being necessary for obtaining the desired product to carry out the reduction process, if such process is on the whole possible to perform in practice, under such conditions with regard to reducing agents, temperatures and so on as to render the production too expensive.

An example of such an ore is chromite which is the most important raw material for chromium in the production of chromium or chromium alloys, as iron chromium alloys, e. g. chromium alloyed iron and steel and ferro-chromium. Chromite has the composition $Cr_2O_3.FeO$ in which, in part, MgO may be substituted for FeO and $Al_2O_3$ and/or $Fe_2O_3$ for $Cr_2O_3$, and often containing $SiO_2$. Chromite is found in several places of the world and contains from 35 to 55% $Cr_2O_3$ according to its pureness.

In the reduction of chromite for the production of ferro-chromium the greatest difficulties are, as known, to obtain a product sufficiently low in carbon. For this purpose it has been necessary to resort to expensive decarburization processes, e. g. Bessemer blowing, or to expensive reducing agents. The difficulties might, at least in part, depend on the fact that in the reduction the chromite forms a large quantity of slag which is often very tenacious. This large quantity of slag is as such very difficult to handle and renders also difficult to deal with the charge per se resulting in an inhomogeneous and, in many cases, commercially unsatisfactory product.

Similar difficulties are met with in the production of rust-resisting material, i. e. iron and steel having a less content of chromium as compared with ferro-chromium, e. g. so-called 18–8 steels, either when in this production the reducing and melting of the iron and the chromium are carried out simultaneously or when an iron bath of desired carbon content is produced in the furnace and the chromium introduced in said bath by the reduction of chromite with the aid of a suitable reducing agent, e. g. ferro-silicon.

The invention relates to a method for the recovery of metals or metal compounds from complex ores which facilitates the use of such ores in the production of metals or metal compounds. The method according to the invention comprises comminuting the ore, heating said comminuted ore under oxidizing conditions intensified as compared with normal roasting, controlling the degree of comminution, the temperature and the oxidizing conditions so as to cause the bond between the constituents of the ore to be destroyed, and separating one or more valuable metals or metal compounds from the oxidized ore thus treated.

Consequently, according to the invention, this oxidizing "splitting" of the ore is effected by appropriately adapting the degree of comminution, the temperature and the actual oxidizing conditions, it having been established that there are optima of these factors at which the process proceeds in the most satisfactory manner. These optima may be determined e. g. by X-ray photographing the products obtained under varying conditions, according to the Debye method.

The separation of the metallic constituents from the split ore obtained by the above oxidizing treatment may be carried out in any suitable manner depending on the nature of the ore treated, as for instance by magnetic separation, flotation, shaking troughs, chemical processes and so on.

When applied to ores containing oxide or oxides of iron and oxide or oxides of another metal, the oxidized ore is, according to the invention, subjected to a reduction process so as to reduce the iron oxide or oxides, at least in part, to metallic iron, the iron thus reduced being then separated from the remaining material. During said reduction the reducing conditions are, preferably, so controlled that the oxide or oxides of the other metal are left substantially unchanged. The separation of the iron from the oxide or oxides of the other metal may be carried out in any suitable manner, preferably by magnetic separation, but it is also possible to effect this separation in wet chemical way, i. g. leaching by means of an acid as for instance hydrochloric acid, capable of dissolving the iron while leaving said oxide or oxides of the other metal unattacked.

The invention also includes the metal or metal compound materials produced according to the above method, especially a chromium material containing 70% and upwards of $Cr_2O_3$.

The degree of comminution may vary according to the crystalline structure of the ore and is preferably determined by microphotography in such manner as to cause by the comminution the individual crystals to be entirely separated from each other along the laminae so that the ore will offer the greatest possible surface to the medium causing the oxidation.

The temperature should not amount to the sintering temperature of the ore, and its lower limit is determined by the desired speed of reaction.

The oxidizing conditions may e. g. be effected by the finely comminuted ore being heated together with a solid oxidizing agent of any kind of which potassium and sodium nitrates may be mentioned as typical well known examples. The choice of said agent depends, of course, on the nature of the ore to be treated, the heating temperature, the apparatus used for the heating process and so on. In this respect it is of importance that the oxidizing agent and the ore are intimately mixed with one another. Further, stirring of the mixture during the process is advantageous.

However, instead of using a solid oxidizing agent it is preferred in most cases to carry out the process in an oxidizing atmosphere at atmospheric or increased pressure, for instance in a stream of oxygen, gases containing oxygen or other oxidizing gases. An especially strong splitting action can be effected by ozone or gases containing ozone. When using gases containing oxygen or other oxidizing gases, the oxidizing property of the gas mixture used should be greater than that of air.

The invention will be described below as applied to chromite.

The chromite is comminuted in an apparatus suitable for this purpose to a grading which in this case was 30 to 100µ, e. g. 50µ. The comminuted ore was introduced (preferably continuously) into a rotating furnace, channel furnace or the like in which it was heated to about 1000 to 1200° C. in the presence of oxygen which was passed through the furnace in the form of a continuous stream of pure oxygen. Under the conditions given above a temperature of about 1050° C. has proved to be the optimal temperature.

By this oxidizing heating of the chromites a so to say molecular splitting of the ore takes place which may depend on FeO of the chromite being oxidized to $Fe_3O_4$ and/or $Fe_2O_3$. On the contrary, the chromium sesqui-oxide seems to remain unchanged. By this change in composition the ore will be split, i. e. the original very rigid bond between FeO, $Cr_2O_3$ and gangue will be destroyed.

After the oxidizing treatment the split chromite is subjected to a reduction process under such reducing conditions as to cause the iron oxides in the ore, substantially $Fe_2O_3$, to be reduced, wholly or in part, to metallic iron, whereas the chromium sesqui-oxide remains substantially unchanged. This reduction may be carried out in any suitable manner and by any appropriate reducing agent, e. g. in the same furnace by passing therethrough a stream of hydrogen at a temperature of about 600–900° C. By this reduction not only the iron oxide grains are reduced but also such iron compounds seem to be reduced which are disseminated in the gangue, e. g. in the silicate grains thereof.

After the reduction the material is subjected to magnetic separation, preferably after having been subjected to any mechanical loosening treatment to eliminate such adhesion of the grains to one another which may occur during the reduction process. For the magnetic separation known separators for magnetic dressing of iron ores may be used at greater or less advantage. By this magnetic dressing the chromium sesqui-oxide is separated not only from the iron but also from the gangue.

The product obtained is a chromium material having a content of $Cr_2O_3$ which varies according to the intensity of the dressing process and which, in practice, may amount to beyond 70% up to 80 to 90% and still more, samples having shown a content of $Cr_2O_3$ of 96.4%. This material could not hitherto be produced in practice and is very suitable as raw material for chromium in the production of chromium and chromium alloys. So for instance, it will be possible by reduction with the aid of ferro-silicon to obtain a ferro-chromium having a chromium content of up to 80 to 90% and of very low carbon content, e. g. below 0.05% as no carbon is used during the process except that introduced with the ferro-silicon. Such a ferro-chromium is not hitherto produced in practice. The product obtained may, of course, also serve as raw material for the production of chromic acid compounds, e. g. chromates, in which case for instance alcali nitrate may be used as suitable oxidizing agent.

In the manner above described with regard to chromite ores also other complex ores, e. g. tungsten, vanadium, molybdenum, titanium ores or the like, may be treated according to the invention. The invention may also be applied to complex non-ferrous ores, in which case the dressing process must, of course, be modified according to the nature of the ore.

What I claim is:—

1. A method of treating complex ores, containing oxide of iron and oxide of another heavy metal, which comprises comminuting the ore, heating the comminuted ore under oxidizing conditions while controlling the degree of comminution, the heating temperature and the oxidizing conditions so as to cause the bond between the constituents of the ore to be destroyed, reducing the oxidized ore so as to cause iron oxide to be reduced, at least in part, to metallic iron, while leaving the oxide of the other heavy metal substantially unchanged, and separating the iron thus reduced.

2. A method of treating complex ores containing oxide of iron and oxide of another heavy metal, which comprises comminuting the ore, heating the comminuted ore in an oxidizing atmosphere while controlling the degree of comminution, the heating temperature and the oxidizing conditions so as to cause the bond between the constituents of the ore to be destroyed, reducing the oxidized ore so as to cause iron oxide to be reduced, at least in part, to metallic iron, while leaving the oxide of the other heavy metal substantially unchanged, and separating the iron thus reduced.

3. A method of treating complex ores containing oxide of iron and oxide of another heavy metal, which comprises comminuting the ore, heating the comminuted ore in a stream of oxygen containing gases while controlling the degree of comminution, the heating temperature and the oxidizing conditions so as to cause the bond between the constituents of the ore to be destroyed, reducing the oxidized ore so as to cause iron oxide to be reduced, at least in part, to metallic iron, while leaving the oxide of the other heavy metal substantially unchanged, and separating the iron thus reduced.

4. A method of treating complex ores in naturally comminuted form and containing oxide of iron and oxide of another heavy metal, which comprises heating the ore in comminuted state under oxidizing conditions while controlling the degree of comminution, the heating temperature and the oxidizing conditions so as to cause the bond between the constituents of the ore to be destroyed, reducing the oxidized ore so as to cause iron oxide to be reduced, at least in part, to metallic iron, while leaving the oxide of the other heavy metal substantially unchanged, and separating the iron thus reduced.

5. A method of treating complex ores containing oxide of iron and oxide of another heavy metal, which comprises heating the ore in comminuted state under oxidizing conditions while controlling the degree of comminution, the heating temperature and the oxidizing conditions so as to cause the bond between the constituents of the ore to be destroyed, reducing the oxidized ore so as to cause iron oxide to be reduced, at least in part, to metallic iron, while leaving the oxide of the other heavy metal substantially unchanged, subjecting the reduced material to a loosening action and separating the iron thus reduced.

6. A method of treating complex ores containing oxide of iron and oxide of another heavy metal, which comprises heating the ore in comminuted state at a temperature between 1000° and 1200° under oxidizing conditions so as to cause the bond between the constituents of the ore to be destroyed, reducing the oxidized ore so as to cause iron oxide to be reduced, at least in part, to metallic iron, while leaving the oxide of the other heavy metal substantially unchanged, and separating the iron thus reduced.

7. A method of treating chromite, which comprises comminuting the ore, heating the comminuted ore under oxidizing conditions while controlling the degree of comminution, the heating temperature and the oxidizing conditions so as to cause the bond between the constituents of the ore to be destroyed, reducing the oxidized ore so as to cause iron oxide to be reduced, at least in part, to metallic iron, while leaving the chromium sesqui-oxide substantially unchanged, and separating the iron thus reduced from said chromium sesqui-oxide.

8. A method of treating chromite, which comprises heating chromite in comminuted state in an oxidizing atmosphere while controlling the degree of comminution, the heating temperature and the oxidizing conditions so as to cause the bond between the constituents of the ore to be destroyed, reducing the oxidized ore so as to cause iron oxide to be reduced, at least in part, to metallic iron, while leaving the chromium sesqui-oxide substantially unchanged, and separating the iron thus reduced from said chromium sesqui-oxide by magnetic separation.

9. A method of treating chromite, which comprises heating chromite in comminuted state in a stream of oxygen containing gases at a temperature between 1000° and 1200° so as to cause the bond between the constituents of the chromite to be destroyed, reducing the oxidized chromite in a reducing atmosphere so as to cause iron oxide to be reduced, at least in part, to metallic iron, while leaving the chromium sesqui-oxide substantially unchanged, and separating the iron thus reduced by magnetic separation.

AXEL HAMMARBERG.